United States Patent
Mun et al.

(10) Patent No.: US 11,907,635 B2
(45) Date of Patent: Feb. 20, 2024

(54) MODELING CIRCUIT OF FIELD EFFECT TRANSISTOR FOR SYMMETRIC MODELING OF ELECTROSTATIC DISCHARGE CHARACTERISTIC, METHOD OF DESIGNING INTEGRATED CIRCUIT USING THE SAME AND METHOD OF MANUFACTURING INTEGRATED CIRCUIT USING THE SAME

(71) Applicant: Samsung Electronics Co., Ltd., Suwon-si (KR)

(72) Inventors: Seongjin Mun, Bucheon-si (KR); Kiyoung Moon, Yongin-si (KR); Hyein Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 379 days.

(21) Appl. No.: 17/391,458

(22) Filed: Aug. 2, 2021

(65) Prior Publication Data
US 2022/0164516 A1    May 26, 2022

(30) Foreign Application Priority Data
Nov. 26, 2020 (KR) .................. 10-2020-0160657

(51) Int. Cl.
*H01L 27/02* (2006.01)
*G06F 30/398* (2020.01)
(Continued)

(52) U.S. Cl.
CPC ........ *G06F 30/398* (2020.01); *H01L 27/0266* (2013.01); *H01L 27/0635* (2013.01); *H03K 17/567* (2013.01)

(58) Field of Classification Search
USPC .............. 703/14; 361/56; 716/100, 101, 102
See application file for complete search history.

(56) References Cited

U.S. PATENT DOCUMENTS 7,619,482 B1 * 11/2009 Kobayashi .............. H03F 3/193
330/311
7,933,753 B2    4/2011 Yang et al.
(Continued)

FOREIGN PATENT DOCUMENTS

KR    10-0795328 B1    1/2008

*Primary Examiner* — Brian Ngo
(74) *Attorney, Agent, or Firm* — Harness, Dickey & Pierce, P.L.C.

(57) ABSTRACT

A modeling circuit of a field effect transistor includes a first field effect transistor, a first bipolar transistor, a second bipolar transistor and a substrate resistor. The first bipolar transistor has a collector electrode connected to a first node corresponding to a first electrode of the first field effect transistor, an emitter electrode connected to a second node corresponding to a second electrode of the first field effect transistor, and a base electrode. The second bipolar transistor has a collector electrode connected to the second node, an emitter electrode connected to the first node, and a base electrode connected to the base electrode of the first bipolar transistor. The substrate resistor is connected between the base electrodes of the first and second bipolar transistors and a first surface of a semiconductor substrate on which the first field effect transistor is formed.

20 Claims, 14 Drawing Sheets

(51) Int. Cl.
  *H03K 17/567*  (2006.01)
  *H01L 27/06*  (2006.01)

(56) References Cited

U.S. PATENT DOCUMENTS

| | | |
|---|---|---|
| 9,653,453 B2 | 5/2017 | Sorgeloos et al. |
| 10,063,048 B2 | 8/2018 | Smith |
| 10,263,420 B2 | 4/2019 | Braun |
| 10,332,871 B2 | 6/2019 | Russ et al. |
| 11,114,432 B2 * | 9/2021 | Hua .................... H01L 27/0262 |
| 2006/0001100 A1 | 1/2006 | Kamei et al. |
| 2008/0133203 A1 * | 6/2008 | Yang ..................... G06F 30/367 |
| | | 703/14 |
| 2009/0303644 A1 * | 12/2009 | Barbier ............ H03K 17/08122 |
| | | 29/825 |
| 2014/0133055 A1 * | 5/2014 | Parthasarathy ........ H02H 9/041 |
| | | 361/56 |
| 2015/0162746 A1 * | 6/2015 | Ikeda ..................... H02H 9/046 |
| | | 361/56 |
| 2018/0083441 A1 | 3/2018 | Natarajan et al. |
| 2020/0028503 A1 * | 1/2020 | Soma ................. H03K 17/063 |
| 2021/0226444 A1 * | 7/2021 | Fang ................. H03K 17/0822 |

* cited by examiner

MODELING CIRCUIT OF FIELD EFFECT TRANSISTOR FOR SYMMETRIC MODELING OF ELECTROSTATIC DISCHARGE CHARACTERISTIC, METHOD OF DESIGNING INTEGRATED CIRCUIT USING THE SAME AND METHOD OF MANUFACTURING INTEGRATED CIRCUIT USING THE SAME

CROSS-REFERENCE TO RELATED APPLICATION

This application claims priority under 35 USC § 119 to Korean Patent Application No. 10-2020-0160657 filed on Nov. 26, 2020 in the Korean Intellectual Property Office (KIPO), the contents of which are herein incorporated by reference in their entirety.

BACKGROUND

Some example embodiments relate generally to semiconductor integrated circuits, and more particularly to modeling circuits of field effect transistors for symmetric modeling of electrostatic discharge characteristic, and/or methods of designing integrated circuits and methods of manufacturing integrated circuits using the modeling circuits.

In the fabrication of semiconductor memory devices, designing an integrated circuit including function blocks is essential. In the process of designing an integrated circuit, advance verification of whether the integrated circuit is operating properly is performed. Software Process Improvement and Capability dEtermination (SPICE) is widely used as a simulator that verifies an operation of an integrated circuit. SPICE may perform modeling of various devices that are included in the integrated circuit using resistors, capacitors, and/or current sources reflecting electrical characteristic of the devices. In particular, a study on modeling of a metal oxide semiconductor (MOS) transistor continuously progresses because MOS transistors are widely used devices in integrated circuits.

When simulating an integrated circuit included in a semiconductor device, the simulation is to be performed based on consideration of electrostatic discharge (ESD) characteristic of all of the MOS transistors included in the integrated circuit. Polarities of the drains and sources of MOST transistors can be changed according to voltages applied thereto. For example, a high voltage can be applied to a drain of a transistor and a low voltage can be applied to a source of the transistor. In contrast, a low voltage can be applied to a drain and a high voltage can be applied to a source.

SUMMARY

Some example embodiments of inventive concepts provide a modeling circuit of a field effect transistor capable of improving and/or enhancing the simulation accuracy by symmetrically modeling electrostatic discharge characteristics.

Some example embodiments of inventive concepts provide a method of designing an integrated circuit and/or a method of manufacturing an integrated circuit using the modeling circuit.

According to some example embodiments, a modeling circuit of a field effect transistor includes a first field effect transistor on a semiconductor substrate, the first field effect transistor including a first electrode and a second electrode, a first bipolar transistor having a first collector electrode connected to a first node corresponding to the first electrode of the first field effect transistor, a first emitter electrode connected to a second node corresponding to the second electrode of the first field effect transistor, and a first base electrode, a second bipolar transistor having a second collector electrode connected to the second node, a second emitter electrode connected to the first node, and a second base electrode connected to the first base electrode of the first bipolar transistor, and a substrate resistor connected between the first and second base electrodes and a first surface of the semiconductor substrate.

According to some example embodiments, a method of designing an integrated circuit includes obtaining a circuit structure of the integrated circuit, the circuit structure including at least one field effect transistor, and analyzing the circuit structure and verifying the circuit structure, the analyzing and verifying using a modeling circuit of a field effect transistor. The modeling circuit includes a first field effect transistor on a semiconductor substrate, a first bipolar transistor having a first collector electrode connected to a first node corresponding to a first electrode of the first field effect transistor, a first emitter electrode connected to a second node corresponding to a second electrode of the first field effect transistor, and a first base electrode, a second bipolar transistor having a second collector electrode connected to the second node, a second emitter electrode connected to the first node, and a second base electrode connected to the first base electrode of the first bipolar transistor, and a substrate resistor connected between the first and second base electrodes and a first surface of the semiconductor substrate.

According to some example embodiments, a modeling circuit of a field effect transistor includes a first n-type metal oxide semiconductor field effect transistor (NMOSFET) having a drain electrode, a source electrode, a gate electrode, and a bulk electrode, a first resistor connected between the drain electrode of the first NMOSFET and a first node, a second resistor connected between the source electrode of the first NMOSFET and a second node, a third resistor connected between the first node and a drain terminal for external connection, a fourth resistor connected between the second node and a source terminal for external connection, a first most exquisite transistor model-bipolar junction transistor (MEXTRAM-BJT) having a first collector electrode connected to the first node, a first emitter electrode connected to the second node, and a first base electrode, a second MEXTRAM-BJT having a second collector electrode connected to the second node, a second emitter electrode connected to the first node, and a second base electrode connected to the bulk electrode of the first NMOSFET and the first base electrode of the first MEXTRAM-BJT, a substrate resistor connected between the first and second base electrodes and a bulk external connection terminal, a first diode and a fifth resistor connected in series between the first node and the bulk external connection terminal, and a second diode and a sixth resistor connected in series between the second node and the bulk external connection terminal. The first and second resistors correspond to MOSFET active resistances of the first NMOSFET, and the third and fourth resistors correspond to parasitic BJT active resistances of the first and second MEXTRAM-BJTs.

According to some example embodiments, a method of manufacturing an integrated circuit includes designing the integrated circuit including at least one field effect transistor on a semiconductor substrate, and fabricating the integrated circuit based on a result of designing the integrated circuit. The designing the integrated circuit includes obtaining a circuit structure of the integrated circuit, and analyzing the circuit structure and verifying the circuit structure of the integrated circuit, the analyzing and verifying using a modeling circuit of a field effect transistor. The modeling circuit includes a first field effect transistor on a substrate, a first bipolar transistor having a first collector electrode connected to a first node corresponding to a first electrode of the first field effect transistor, a first emitter electrode connected to a second node corresponding to a second electrode of the first field effect transistor, and a first base electrode, a second bipolar transistor having a second collector electrode connected to the second node, a second emitter electrode connected to the first node, and a second base electrode connected to the first base electrode of the first bipolar transistor, and a substrate resistor connected between the first and second base electrodes and a first surface of the semiconductor substrate.

The modeling circuit of the field effect transistor according to some example embodiments may include two bipolar transistors connected in opposite directions, and thus the modeling may be performed with the symmetrical ESD operation and more accurate analysis may be performed regardless of the connection status of the element. Alternatively or additionally, the MOSFET active resistances and the parasitic BJT active resistances may be separated from each other in the modeling circuit, and thus the accuracy of modeling and/or simulation may be improved and/or the forward direction modeling other than the snapback effect may be performed based on the forward diode model. Alternatively or additionally, the physical model based on the MEXTRAM-BJTs may be applied to the modeling circuit, and thus the problem associated with convergence may be prevented or reduced in likelihood of occurrence even when the large-scaled I/O circuits are analyzed using the SPICE.

In the method of designing the integrated circuit according to some example embodiments, the analysis operations and verification operations may be performed using at least one of the modeling circuits according to some example embodiments. Accordingly, the modeling circuits may be applicable to many or most field effect transistors in the integrated circuit, and/or the accuracy and/or efficiency of the analysis and verification operations may be improved.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EXAMPLE EMBODIMENTS

Figure 1:
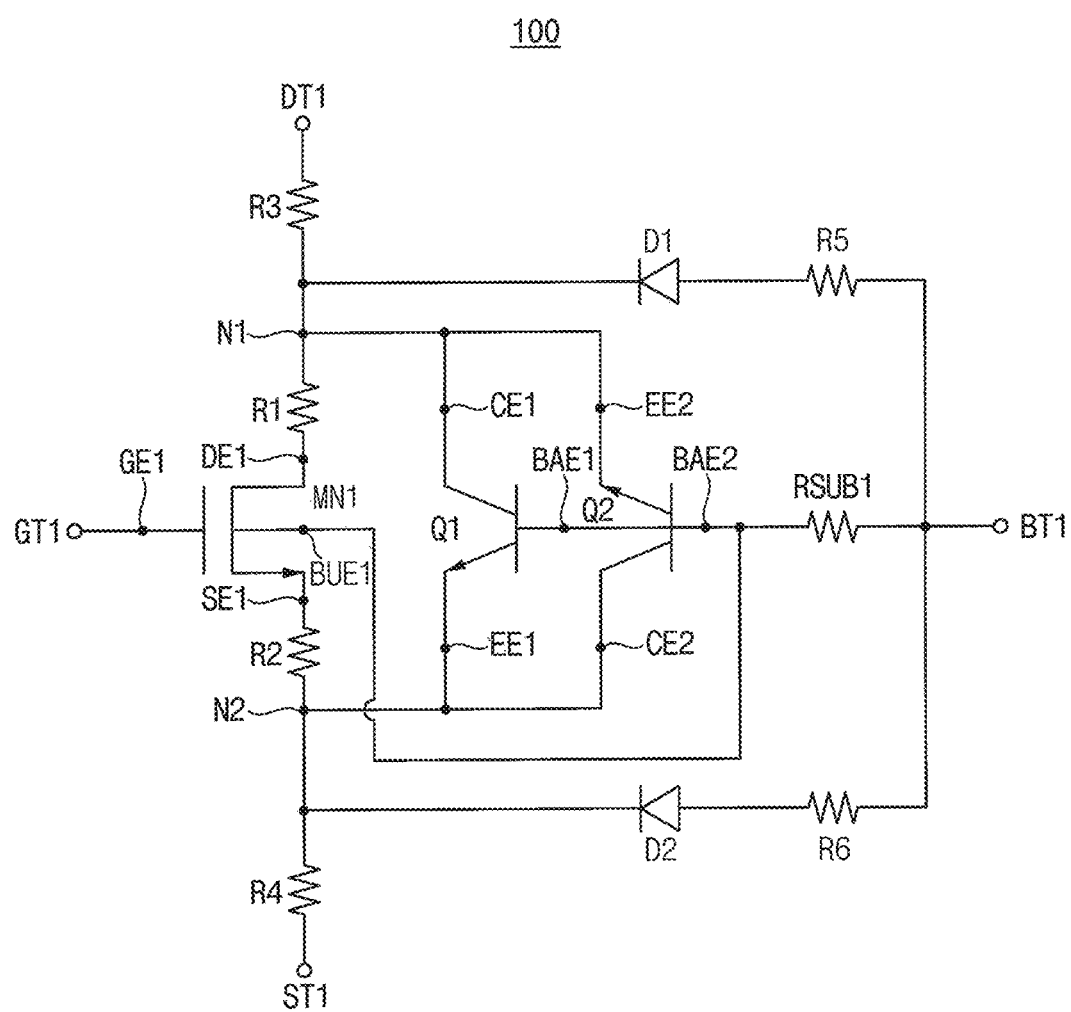
FIG. 1 is a circuit diagram illustrating a modeling circuit of a field effect transistor according to some example embodiments.

Various example embodiments will be described more fully with reference to the accompanying drawings, in which some example embodiments are shown and described. Inventive concepts may, however, be embodied in many different forms and should not be construed as limited to the embodiments set forth herein. Like reference numerals refer to like elements throughout this application.

FIG. 1 is a circuit diagram illustrating a modeling circuit of a field effect transistor according to some example embodiments. The modeling circuit may be used, for example, in SPICE modeling.

Referring to FIG. 1, a modeling circuit 100 of a field effect transistor includes a first field effect transistor MN1, a first bipolar transistor Q1, a second bipolar transistor Q2 and a substrate resistor RSUB1. The modeling circuit 100 may further include a first resistor R1, a second resistor R2, a third resistor R3, a fourth resistor R4, a fifth resistor R5, a sixth resistor R6, a first diode D1 and a second diode D2.

The modeling circuit 100 may be applied to Software Process Improvement and Capability dEtermination (SPICE), and may be used to model and/or simulate a field effect transistor included in an integrated circuit, and/or to verify an operation of the integrated circuit. A method of verifying the operation of the integrated circuit and/or a method of designing the integrated circuit using the modeling circuit 100 will be described with reference to FIG. 9.

The first field effect transistor MN1 has a first electrode DE1, a second electrode SE1, a gate electrode GE1 and a bulk electrode BUE1. The first field effect transistor MN1 may correspond to a target field effect transistor to be modeled using the modeling circuit 100.

In some example embodiments, the first field effect transistor MN1 may be an n-type metal oxide semiconductor (NMOS) transistor. For example, the first field effect transistor MN1 may be an n-type metal oxide semiconductor field effect transistor (NMOSFET). In this example, the first electrode DE1 may be a drain electrode, and the second electrode SE1 may be a source electrode; however, example embodiments are not limited thereto. The bulk electrode BUE1 may be referred to as a substrate electrode and/or a body electrode.

The first bipolar transistor Q1 has a collector electrode CE1 connected to a first node N1 corresponding to/associated with/in series with/shorted with/passively connected to the first electrode DE1 of the first field effect transistor MN1, an emitter electrode EE1 connected to a second node N2 corresponding to/associated with/in series with/shorted with/passively connected to the second electrode SE1 of the first field effect transistor MN1, and a base electrode BAE1.

The second bipolar transistor Q2 has a collector electrode CE2 connected to/shorted with the second node N2, an emitter electrode EE2 connected to/shorted with the first node N1, and a base electrode BAE2 connected to/shorted with the bulk electrode BUE1 of the first field effect transistor MN1 and the base electrode BAE1 of the first bipolar transistor Q1.

As illustrated in FIG. 1, the bulk electrode BUE1 of the first field effect transistor MN1, the base electrode BAE1 of the first bipolar transistor Q1 and the base electrode BAE2 of the second bipolar transistor Q2 may be connected in common, e.g. may be directly connected with each other.

In addition, as illustrated in FIG. 1, the first field effect transistor MN1, the first bipolar transistor Q1 and the second bipolar transistor Q2 may be connected in parallel to each other, and the first bipolar transistor Q1 and the second bipolar transistor Q2 may be connected in opposite directions. For example, the collector electrode CE1 of the first bipolar transistor Q1 may be connected to the first node N1 and the emitter electrode EE1 of the first bipolar transistor Q1 may be connected to the second node N2, and the collector electrode CE2 of the second bipolar transistor Q2 may be connected to the second node N2 and the emitter electrode EE2 of the second bipolar transistor Q2 may be connected to the first node N1. Accordingly, the symmetrical modeling may be implemented and/or performed.

In some example embodiments, when the first bipolar transistor Q1 and the second bipolar transistor Q2 are connected in opposite directions as described above, the first field effect transistor MN1 may be symmetrically modeled based on a forward active characteristic of the first bipolar transistor Q1 and a reverse active characteristic of the second bipolar transistor Q2, or, alternatively based on a reverse active characteristic of the first bipolar transistor Q1 and a forward active characteristic of the second bipolar transistor Q2. For example, the forward and reverse active regions of the bipolar transistors Q1 and Q2 may be simultaneously used, and thus the symmetrical electrostatic discharge (ESD) SPICE compact model structure may be more efficiently implemented and/or formed.

In some example embodiments, when the first field effect transistor MN1 is or includes an NMOSFET, each of the first and second bipolar transistors Q1 and Q2 may be, correspond to, include, or be associated with an NPN-type bipolar junction transistor (BJT).

In some example embodiments, each of the first and second bipolar transistors Q1 and Q2 may be, correspond to, include, or be associated with a most exquisite transistor model-bipolar junction transistor (MEXTRAM-BJT). When using the MEXTRAM-BJT, the accuracy of modeling and/or simulation may be improved and/or enhanced.

The substrate resistor RSUB1 may be connected between the base electrodes BAE1 and BAE2 of the first and second bipolar transistors Q1 and Q2 and a first surface of a semiconductor substrate on which the first field effect transistor MN1 is formed, e.g., between the bulk electrode BUE1 of the first field effect transistor MN1 and the first surface of the semiconductor substrate. For example, the first surface of the semiconductor substrate may be or correspond to a backside (or a back surface and/or a rear surface) of the semiconductor substrate. The semiconductor substrate may be doped, e.g. may be lightly doped with impurities such as boron. The first surface of the semiconductor substrate may be connected to a bulk terminal BT1, e.g. an external connection terminal for external connection, and thus the substrate resistor RSUB1 may be connected between the base electrodes BAE1 and BAE2 of the first and second bipolar transistors Q1 and Q2 and the bulk terminal BT1.

The first resistor R1 may be connected between the first electrode DE1 of the first field effect transistor MN1 and the first node N1. The second resistor R2 may be connected between the second electrode SE1 of the first field effect transistor MN1 and the second node N2.

The third resistor R3 may be connected between the first node N1 and a first terminal DT1 as an external connection terminal, e.g. a terminal for external connection. The fourth resistor R4 may be connected between the second node N2 and a second terminal ST1 as an external connection terminal, e.g. a terminal for external connection. For example, when the first field effect transistor MN1 is an NMOSFET, e.g., when the first electrode DE1 of the first field effect transistor MN1 is or corresponds to a drain electrode and the second electrode SE1 of the first field effect transistor MN1 is or corresponds to a source electrode, the first terminal DT1 may be or correspond to a drain terminal corresponding to the drain electrode, and the second terminal ST1 may or correspond to be a source terminal corresponding to the source electrode.

In some example embodiments, as will be described with reference to FIG. 2, the first and second resistors R1 and R2 may represent the active resistances (e.g. on-state resistances) of the first field effect transistor MN1, and the third and fourth resistors R3 and R4 may represent the parasitic active resistances caused by the first and second bipolar transistors Q1 and Q2. For example, when the first field effect transistor MN1 is or corresponds to an NMOSFET, the first and second resistors R1 and R2 may be or correspond to the MOSFET active resistances of the NMOSFET. When the first and second bipolar transistors Q1 and Q2 are or correspond to MEXTRAM-BJTs, the third and fourth resistors R3 and R4 may be or correspond to the parasitic BJT active resistances caused by the MEXTRAM-BJTs. For example, the MOSFET active resistances and the parasitic BJT active resistances may be separated from each other, and thus the ESD SPICE compact model structure may be efficiently implemented or formed.

The first diode D1 and the fifth resistor R5 may be connected in series between the first node N1 and the first surface of the semiconductor substrate (e.g., the bulk terminal BT1). The second diode D2 and the sixth resistor R6 may be connected in series between the second node N2 and the first surface of the semiconductor substrate (e.g., the bulk terminal BT1). The first and second diodes D1 and D2 may form or correspond to the forward diode model.

The gate electrode GE1 of the first field effect transistor MN1 may be connected to a gate terminal GT1 for external connection or connection to other internal components.

The modeling circuit 100 according to some example embodiments may include two bipolar transistors Q1 and Q2 connected in opposite directions, and thus modeling may be performed with the symmetrical ESD operation and the accurate analysis may be performed regardless of the connection status of the element (e.g., the connection status of the drain/source/bulk electrodes). Alternatively or additionally, the MOSFET active resistances and the parasitic BJT active resistances may be separated from each other in the modeling circuit 100, and thus the accuracy of modeling and/or simulation may be improved and/or the forward direction modeling other than the snapback effect may be performed based on the forward diode model. Alternatively or additionally, a physical model based on the MEXTRAM-BJTs may be applied to the modeling circuit 100, and thus a problem associated with convergence may be prevented or reduced in likelihood of occurrence, even when the large-scaled input/output (I/O) circuits are analyzed using the SPICE. The modeling circuit 100 may be a component used to manufacture a semiconductor device. For example, a semiconductor device may use the modeling circuit 100 directly or indirectly during fabrication.

Figure 2:
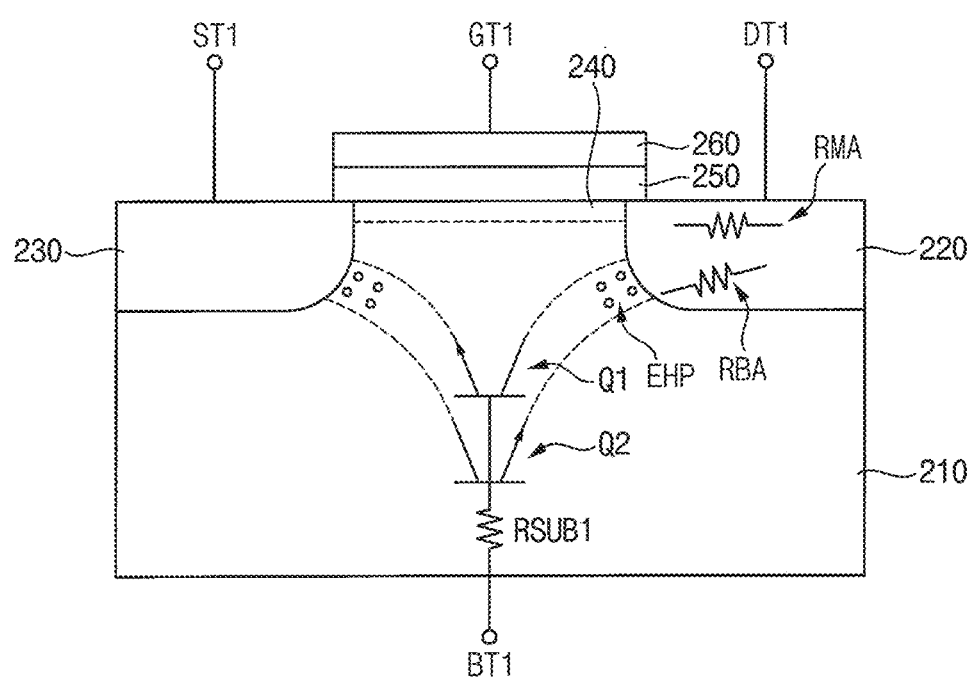
FIG. 2 is a cross-sectional view of an example of connection of elements included in a modeling circuit of FIG. 1.

FIG. 2 is a cross-sectional view of an example of connection of elements included in a modeling circuit of FIG. 1.

Referring to FIG. 2, the first field effect transistor MN1 may include a semiconductor substrate 210 such as a silicon substrate or a silicon-germanium substrate or a III-V substrate in a single-crystal phase, a first region 220 (e.g. a first source/drain region), a second region 230 (e.g. a second source/drain region), a channel region 240, a gate insulating layer 250, e.g. an oxide layer, and a gate region 260, e.g. a polysilicon and/or metal layer.

When the first field effect transistor MN1 is an NMOS-FET, the first region 220 may be or correspond to a drain region and the second region 230 may be or correspond to a source region. In addition, the semiconductor substrate 210 may have a P conductivity type (e.g. may be lightly doped with boron), and each of the first region 220 and the second region 230 may have an N+ conductivity type (e.g. may be more heavily doped with an impurity such as at least one of arsenic or phosphorus).

The first region 220 may correspond to the first electrode DE1 in FIG. 1, the second region 230 may correspond to the second electrode SE1 in FIG. 1, and the gate region 260 may correspond to the gate electrode GE1 in FIG. 1. The first region 220 may be connected to the first terminal DT1, the second region 230 may be connected to the second terminal ST1, the gate region 260 may be connected to the gate terminal GT1, and a backside of the semiconductor substrate 210 may be connected to the bulk terminal BT1. In a physical device, the bulk terminal BT1 may not be physically located on the backside of the semiconductor substrate 210 for external connection. For example a bulk terminal BT1 may be on a frontside of the semiconductor substrate 210, and there may be a contacted (not shown) connected to the bulk terminal BT1 and to portions of the semiconductor substrate 210 at or near the backside of the semiconductor substrate 210.

The semiconductor substrate 210 may include the channel region 240 and the substrate resistor RSUB1. The channel region 240 may be formed in a region adjacent to a frontside of the semiconductor substrate 210 between the first region 220 and the second region 230, and may operate as a current path when the first field effect transistor MN1 is turned on, e.g. when a voltage on the gate terminal GT1 is greater than a threshold voltage of the first field effect transistor MN1. A MOSFET active resistance RMA of the first region 220 may be formed by the channel region 240. The MOSFET active resistance RMA may correspond to the first resistor R1 in FIG. 1. Although not illustrated in FIG. 2, as with the MOSFET active resistance RMA, a MOSFET active resistance of the second region 230, which may correspond to the second resistor R2 in FIG. 1, may be formed by the channel region 240.

In addition, the first field effect transistor MN1 may include the first bipolar transistor Q1 and the second bipolar transistor Q2 that are parasitic elements. When the first field effect transistor MN1 is or corresponds to an NMOSFET, each of the first and second bipolar transistors Q1 and Q2 may be an NPN-type BJT. A parasitic BJT active resistance RBA of the first region 220 may be formed by the first and second bipolar transistors Q1 and Q2. The parasitic BJT active resistance RBA may correspond to the third resistor R3 in FIG. 1. Although not illustrated in FIG. 2, as with the parasitic BJT active resistance RBA, a parasitic BJT active resistance of the second region 230, which corresponds to the fourth resistor R4 in FIG. 1, may be formed by the first and second bipolar transistors Q1 and Q2. The first field effect transistor MN1 may include other elements that are not illustrated. For example the first field effect transistor MN1 may include spacer insulating material on the side of the gate terminal GT1, and/or may include a lightly doped drain (LDD) between the first region 220 and the channel region 240 and/or between the second region 230 and the channel region 240, and/or may include a halo or pocket region horizontally adjacent to the first region 220 horizontally adjacent to the second region 230. The LDD may be the same conductivity type as the first region 220 and the second region 230, and the halo or pocket region may be the opposite conductivity type of the first region 220 and the second region 230.

Hereinafter, an operation of the modeling circuit 100 according to some example embodiments will be described referring to FIGS. 1 and 2.

The first bipolar transistor Q1 may include the base electrode BAE1 composed of/corresponding to the semiconductor substrate 210, the collector electrode CE1 composed of/corresponding to the first region 220, and the emitter electrode EE1 composed of/corresponding to the second region 230. The substrate resistor RSUB1 may represent a resistor between the base electrode BAE1 of the first bipolar transistor Q1 and the backside of the semiconductor substrate 210. Quasiparticles, e.g. electron-hole pairs EHP, may be generated by a positive over-voltage, for example due to hot carrier injection and/or due to impact ionization and/or due to an ESD event that is applied to the first region 220 of the first field effect transistor MN1 in a depletion region formed at a junction between the first region 220 and the semiconductor substrate 210. Then, a base current of the first bipolar transistor Q1 may flow based on the electron-hole pairs EHP. A current flowing through the first bipolar transistor Q1 may flow from the first region 220 to the second region 230 of the first field effect transistor MN1.

The second bipolar transistor Q2 may include the base electrode BAE2 composed of/corresponding to the semiconductor substrate 210, the collector electrode CE2 composed of/corresponding to the second region 230, and the emitter electrode EE2 composed of/corresponding to the first region 220. The substrate resistor RSUB1 may represent a resistor between the base electrode BAE2 of the second bipolar transistor Q2 and the backside of the semiconductor substrate 210. Quasi-particles such as electron-hole pairs EHP may be generated by a positive over-voltage due to an ESD event that is applied to the second region 230 of the first field effect transistor MN1 in a depletion region formed at a junction between the second region 230 and the semiconductor substrate 210. Then, a base current of the second bipolar transistor Q2 may flow based on the electron-hole pairs EHP. A current flowing through the second bipolar transistor Q2 may flow from the second region 230 to the first region 220 of the first field effect transistor MN1.

In the modeling circuit 100 of FIG. 1, when a ground voltage is applied to the second electrode SE1 of the first field effect transistor MN1 and a positive over-voltage is applied to the first electrode DE1 of the first field effect transistor MN1, the first bipolar transistor Q1 may be turned on (e.g., may be in an on-state) and a current may flow through the first bipolar transistor Q1. Then, the second bipolar transistor Q2 may be turned off (e.g., may be in an off-state). Alternatively, when a ground voltage is applied to the first electrode DE1 of the first field effect transistor MN1 and a positive over-voltage is applied to the second electrode SE1 of the first field effect transistor MN1, the second bipolar transistor Q2 may be turned on and a current may flow through the second bipolar transistor Q2. Then, the first bipolar transistor Q1 may be turned off.

Therefore, the modeling circuit 100 may be used in circuit simulation even when a drain terminal and a source terminal are interchanged, e.g., are swapped one for the other. For example, a symmetrical ESD model structure may be efficiently implemented. Alternatively or additionally, when the first and second bipolar transistors Q1 and Q2 are implemented as MEXTRAM-BJTs and the MOSFET active resistances and the parasitic BJT active resistances are separated from each other, the modeling circuit 100 may operate without an additional current source, and/or the accuracy of the modeling and/or simulation may be improved.

Figure 3A:
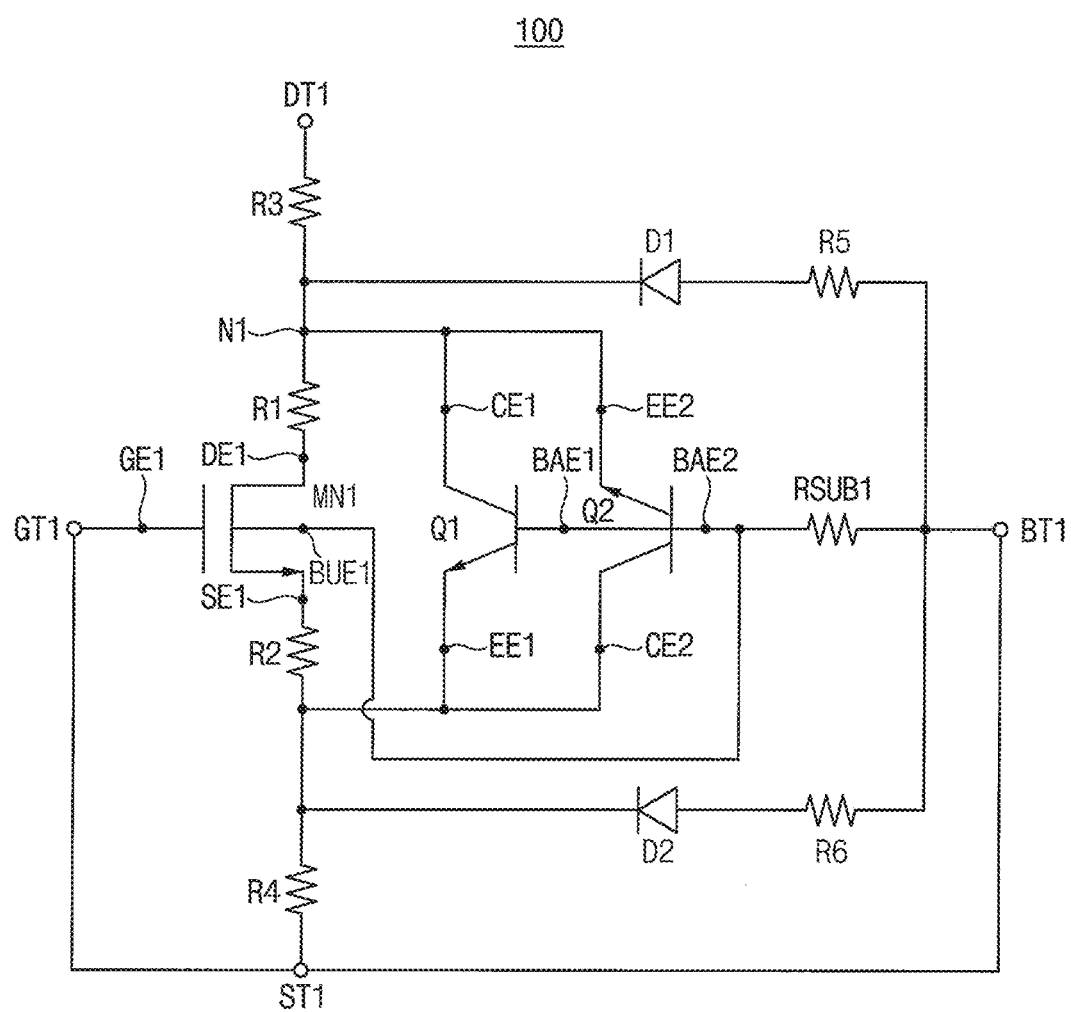
FIGS. 3A and 3B are circuit diagrams illustrating operation modes of a modeling circuit of FIG. 1.
Figure 3B:
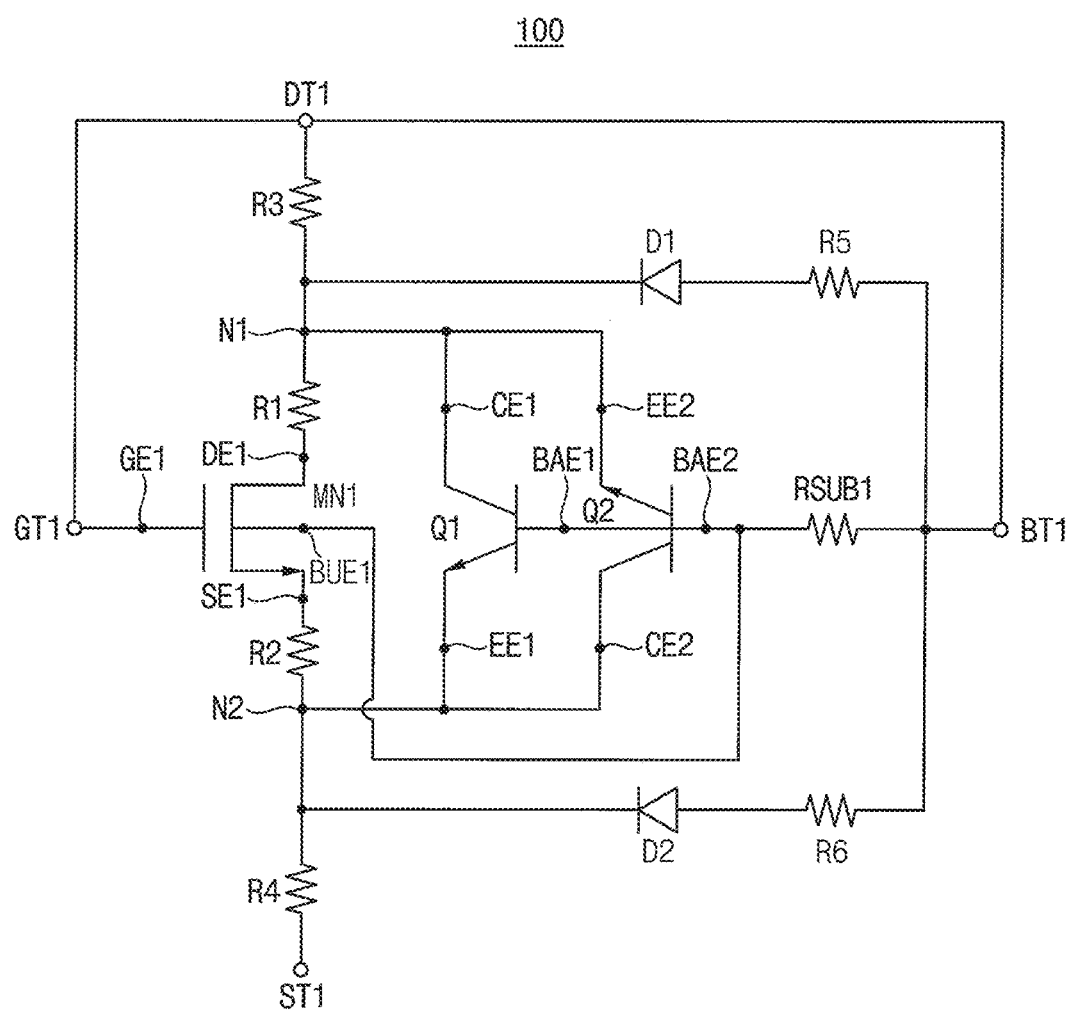

FIGS. 3A and 3B are circuit diagrams illustrating operation modes of a modeling circuit of FIG. 1.

Referring to FIG. 3A, a first operation mode of the modeling circuit 100 is illustrated. The first operation mode may represent an operation mode in which the gate terminal GT1, the second terminal ST1 and the bulk terminal BT1, which are selected from among the first terminal DT1, the second terminal ST1, the gate terminal GT1 and the bulk terminal BT1, are connected in common, e.g. are shorted together and/or ganged together and/or jumped together. The first terminal DT1, the second terminal ST1, the gate terminal GT1 and the bulk terminal BT1 may correspond to the first electrode DE1, the second electrode SE1, the gate electrode GE1 and the bulk electrode BUE1 (e.g., the semiconductor substrate) of the first field effect transistor MN1, respectively.

Referring to FIG. 3B, a second operation mode of the modeling circuit 100 is illustrated. The second operation mode may represent an operation mode in which the gate terminal GT1, the first terminal DT1 and the bulk terminal BT1, which are selected from among the first terminal DT1, the second terminal ST1, the gate terminal GT1 and the bulk terminal BT1, are connected in common, e.g. are shorted together and/or ganged together and/or jumped together.

In some example embodiments, as will be described with reference to FIGS. 4A, 4B, 4C, 5A, 5B and 5C, the operating characteristics during the first operation mode may be substantially the same as the operating characteristics during the second operation mode, and thus a symmetrical modeling may be implemented.

FIGS. 4A, 4B, 4C, 5A, 5B and 5C are diagrams for describing symmetrical modeling characteristics of a modeling circuit of FIG. 1.

Figure 4A:
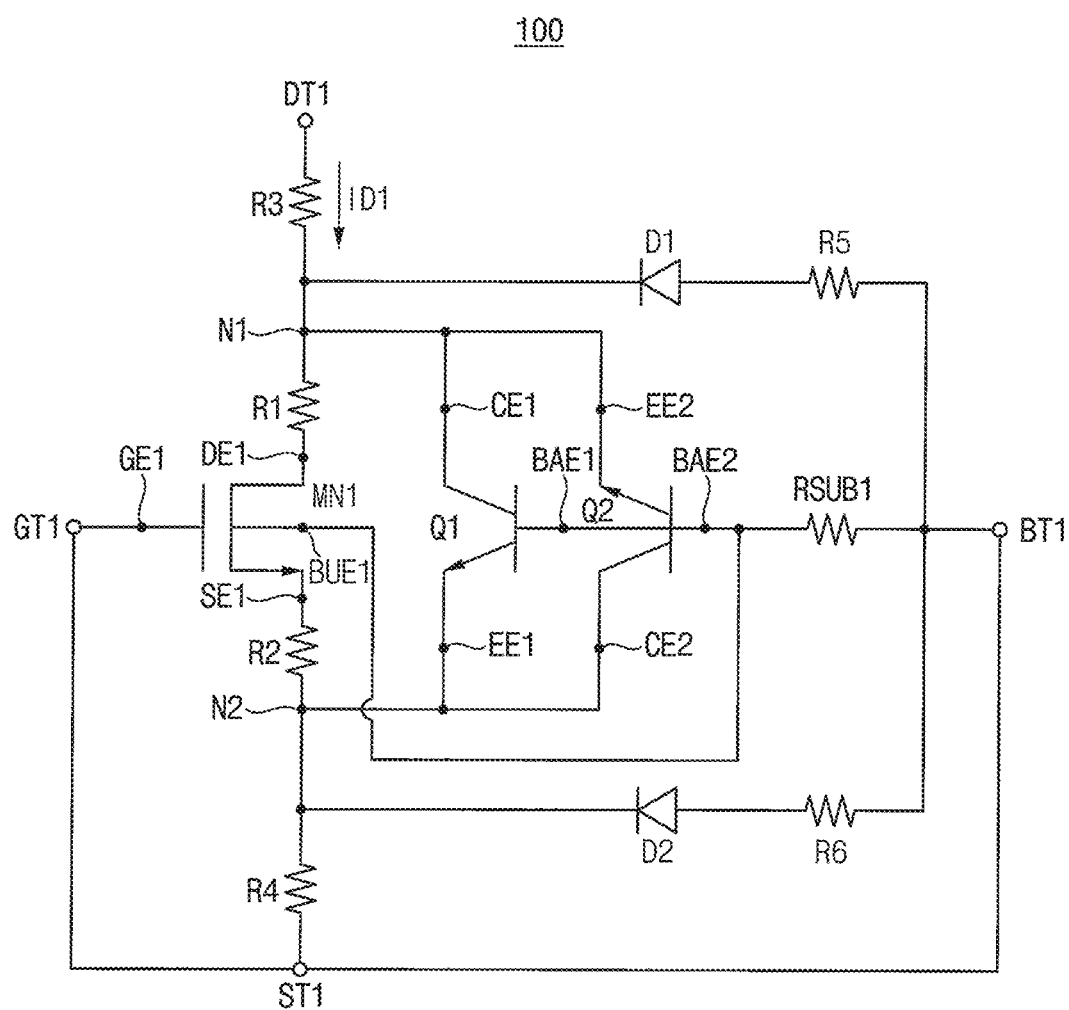
FIGS. 4A, 4B, 4C, 5A, 5B and 5C are diagrams for describing symmetrical modeling characteristics of a modeling circuit of FIG. 1.

Referring to FIG. 4A, a first driving scheme in which the first driving current ID1 is applied through the first terminal DT1 during the first operation mode is illustrated. Although not illustrated in FIG. 4A, a ground voltage may be applied to the second terminal ST1.

Figure 4B:
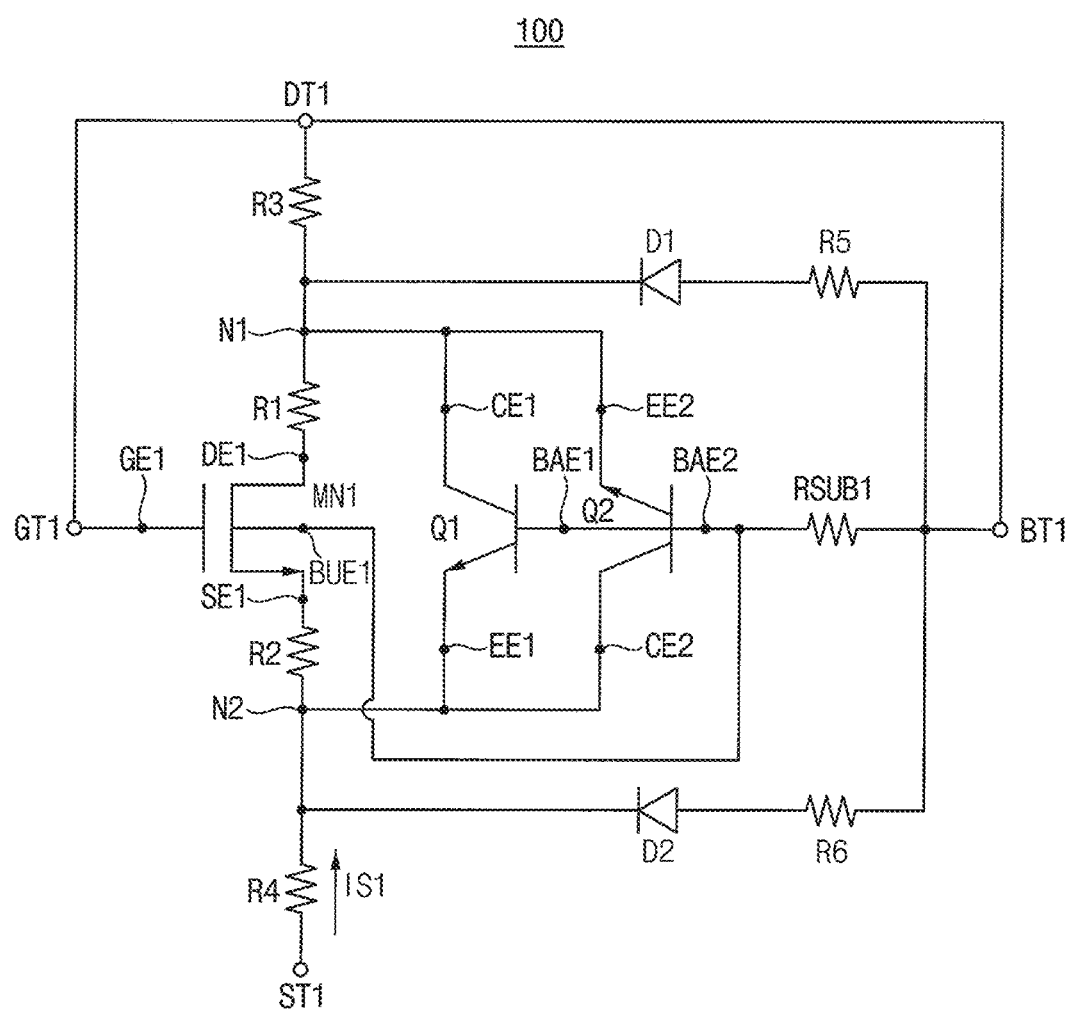

Referring to FIG. 4B, a second driving scheme in which a second driving current IS1 is applied through the second terminal ST1 during second operation mode is illustrated. Although not illustrated in FIG. 4B, a ground voltage may be applied to the first terminal DT1.

Figure 4C:
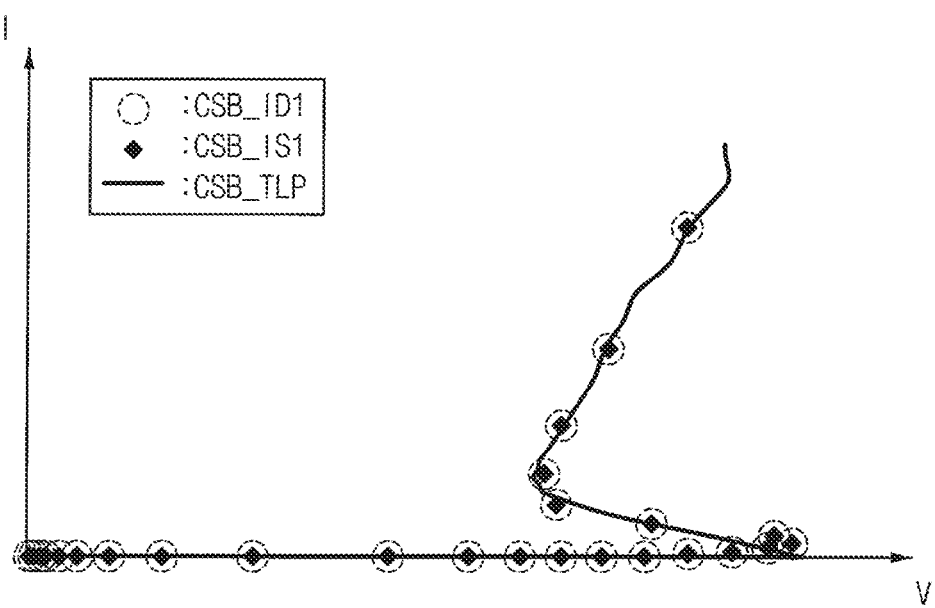

FIG. 4C, illustrates that a first operating characteristic by the first driving scheme of FIG. 4A is substantially the same as a second operating characteristic by the second driving scheme of FIG. 4B. In FIG. 4C, "CSB_ID1" illustrated by dotted circles represents the first operating characteristic by the first driving scheme of FIG. 4A, "CSB_IS1" illustrated by rhombuses represents the second operating characteristic by the second driving scheme of FIG. 4B, and each of the first and second operating characteristics may correspond to the simulation result. In addition, "CSB_TLP" illustrated by thick solid lines represents transmission line pulse (TLP) measurement data, e.g., actual measured data.

As illustrated in FIG. 4C, the first operating characteristic CSB_ID1 and the second operating characteristic CSB_IS1 may be substantially the same as each other, and thus it may be checked that the modeling circuit 100 has the symmetrical modeling structure. In addition, it may be checked that the simulation results (e.g., CSB_ID1 and CSB_IS1) are substantially the same as the actual measured data (e.g., CSB_TLP).

In some example embodiments, as illustrated in FIG. 4C, the first driving scheme of FIG. 4A and the second driving scheme of FIG. 4B (e.g., the first operating characteristic CSB_ID1 and the second operating characteristic CSB_IS1) may correspond to a snapback mode, e.g. a mode in which avalanche breakdown and/or impact ionization occurs, causing the bipolar transistor to turn/remain on.

Figure 5A:
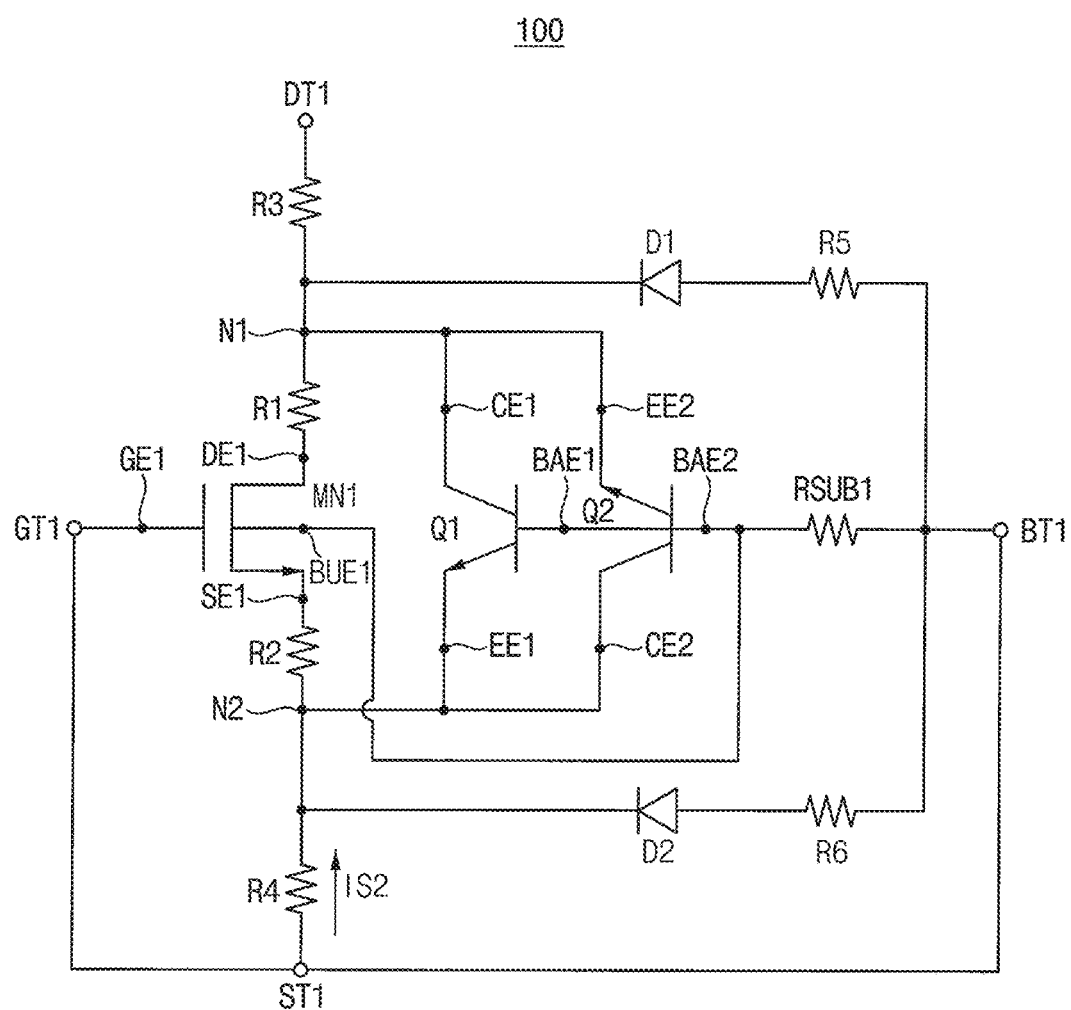

Referring to FIG. 5A, a third driving scheme in which a third driving current IS2 is applied through the second terminal ST1 during the first operation mode is illustrated. Although not illustrated in FIG. 5A, a ground voltage may be applied to the first terminal DT1.

Figure 5B:
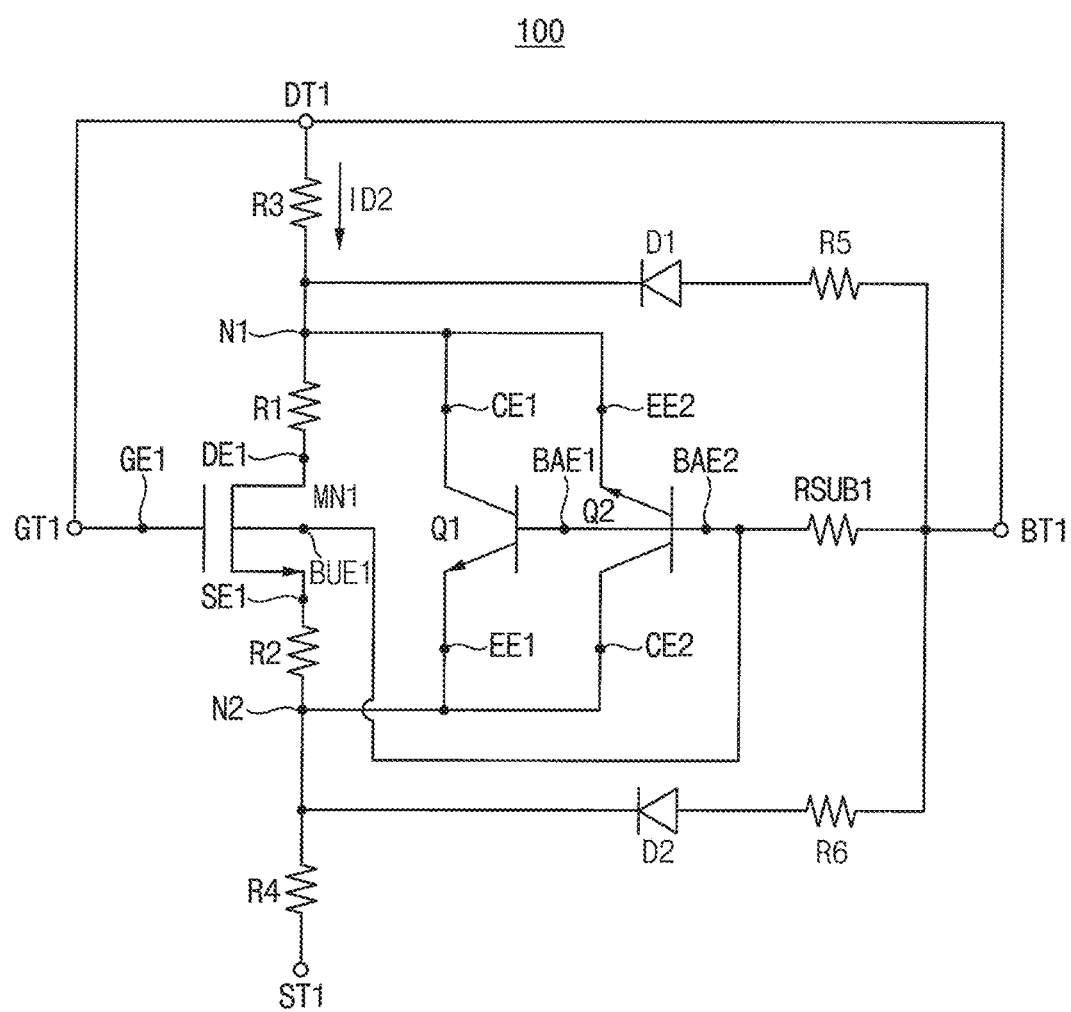

Referring to FIG. 5B, a fourth driving scheme in which a fourth driving current ID2 is applied through the first terminal DT1 during the second operation mode is illustrated. Although not illustrated in FIG. 5B, a ground voltage may be applied to the second terminal ST1.

Figure 5C:
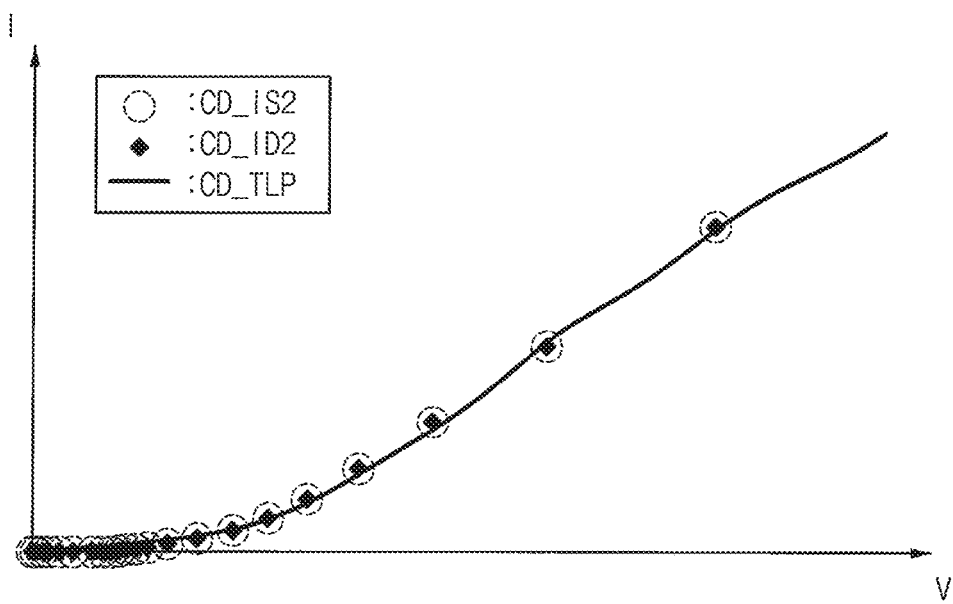

Referring to FIG. 5C, it is illustrated that a third operating characteristic by the third driving scheme of FIG. 5A is substantially the same as a fourth operating characteristic by the fourth driving scheme of FIG. 5B. In FIG. 5C, "CD_IS2" illustrated by dotted circles represents the third operating characteristic by the third driving scheme of FIG. 5A, "CD_ID2" illustrated by rhombuses represents the fourth operating characteristic by the fourth driving scheme of FIG. 5B, and each of the third and fourth operating characteristics may correspond to the simulation result. In addition, "CD_TLP" illustrated by thick solid lines represents TLP measurement data, e.g., actual measured data.

As illustrated in FIG. 5C, the first operating characteristic CD_IS2 and the second operating characteristic CD_ID2 may be substantially the same as each other, and thus it may be checked that the modeling circuit 100 has the symmetrical modeling structure. In addition, the simulation results (e.g., CD_IS2 and CD_ID2) are substantially the same as the actual measured data (e.g., CD_TLP).

In some example embodiments, as illustrated in FIG. 5C, the third driving scheme of FIG. 5A and the fourth driving scheme of FIG. 5B (e.g., the third operating characteristic CD_IS2 and the fourth operating characteristic CD_ID2) may correspond to a diode mode. The modeling circuit 100 according to some example embodiments may model the diode mode illustrated in FIG. 5C as well as the snapback mode illustrated in FIG. 4C because the modeling circuit 100 includes the first and second diodes D1 and D2 (e.g., because the forward diode model is applied to the modeling circuit 100).

Figure 6:
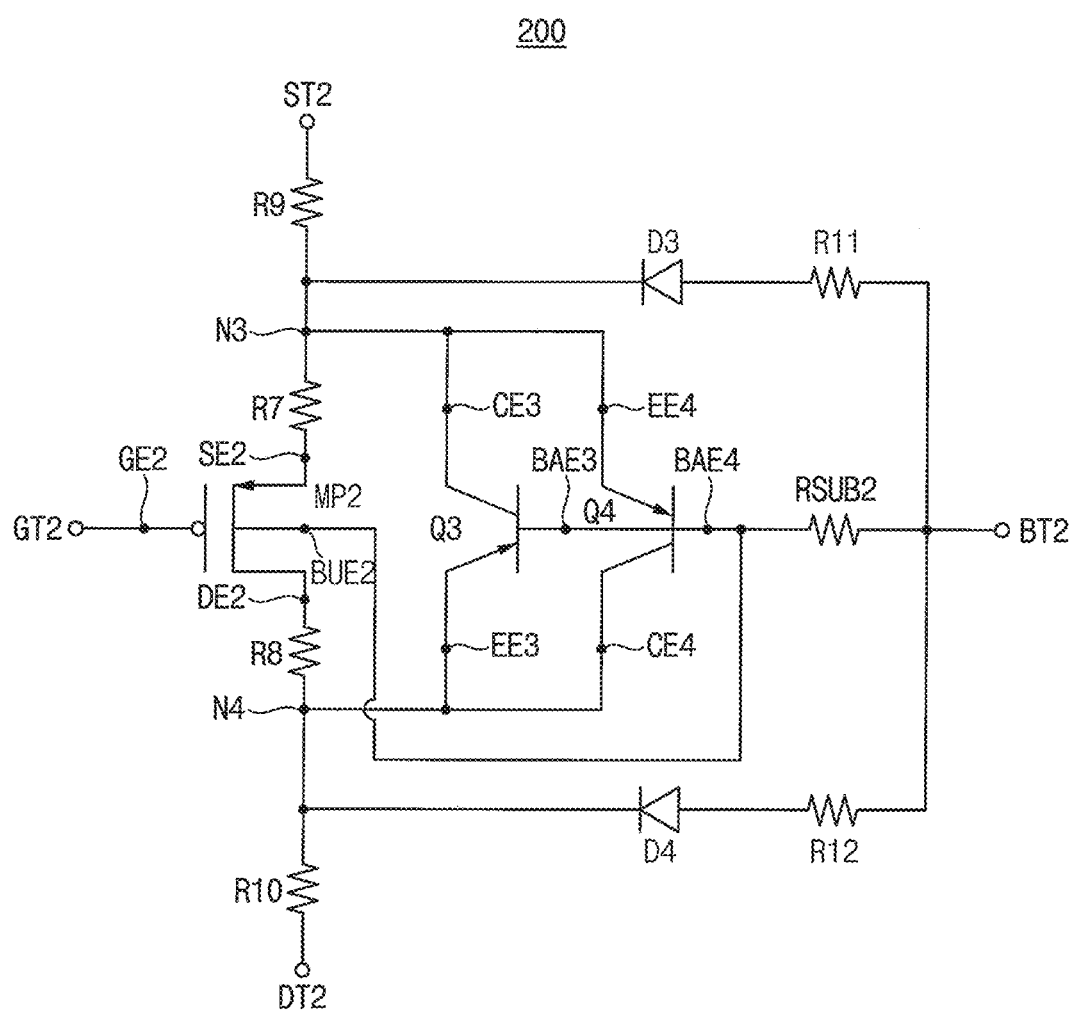
FIG. 6 is a circuit diagram illustrating a modeling circuit of a field effect transistor according to some example embodiments.

FIG. 6 is a circuit diagram illustrating a modeling circuit of a field effect transistor according to some example embodiments. The descriptions repeated with FIG. 1 will be omitted for brevity.

Referring to FIG. 6, a modeling circuit 200 of a field effect transistor includes a first field effect transistor MP2, a first bipolar transistor Q3, a second bipolar transistor Q4 and a substrate resistor RSUB2. The modeling circuit 200 may further include a first resistor R7, a second resistor R8, a third resistor R9, a fourth resistor R10, a fifth resistor R11, a sixth resistor R12, a first diode D3 and a second diode D4.

The first field effect transistor MP2 includes a first electrode SE2, a second electrode DE2 a gate electrode GE2 and a bulk electrode BUE2.

The first bipolar transistor Q3 includes a collector electrode CE3 connected to a first node N3 corresponding to the first electrode SE2 of the first field effect transistor MP2, an emitter electrode EE3 connected to a second node N4 corresponding to the second electrode DE2 of the first field effect transistor MP2, and a base electrode BAE3.

The second bipolar transistor Q4 has a collector electrode CE4 connected to the second node N4, an emitter electrode EE4 connected to the first node N3, and a base electrode BAE4 connected to the bulk electrode BUE2 of the first field effect transistor MP2 and the base electrode BAE3 of the first bipolar transistor Q3.

In some example embodiments, the first field effect transistor MP2 may be or correspond to a p-type metal oxide semiconductor (PMOS) transistor. For example, the first field effect transistor MP2 may be a p-type metal oxide semiconductor field effect transistor (PMOSFET). In this example, the first electrode SE2 may be a source electrode, and the second electrode DE2 may be a drain electrode. In some example embodiments, when the first field effect transistor MP2 is a PMOSFET, each of the first and second bipolar transistors Q3 and Q4 may be or correspond to a PNP-type BJT.

The substrate resistor RSUB2 may be connected between the base electrodes BAE3 and BAE4 of the first and second bipolar transistors Q3 and Q4 and a first surface of a semiconductor substrate on which the first field effect transistor MP2 is formed, e.g., between the bulk electrode BUE2 of the first field effect transistor MP2 and a bulk terminal BT2.

The first field effect transistor MP2, the first bipolar transistor Q3, the second bipolar transistor Q4 and the substrate resistor RSUB2 may be similar to the first field effect transistor MN1, the first bipolar transistor Q1, the second bipolar transistor Q2, and the substrate resistor RSUB1 in FIG. 1, respectively.

The first resistor R7 may be connected between the first electrode SE2 of the first field effect transistor MP2 and the first node N3. The second resistor R8 may be connected between the second electrode DE2 of the first field effect transistor MP2 and the second node N4. The third resistor R9 may be connected between the first node N3 and a first terminal ST2 for external connection. The fourth resistor R10 may be connected between the second node N4 and a second terminal DT2 for external connection. The first diode D3 and the fifth resistor R11 may be connected in series between the first node N3 and the bulk terminal BT2. The second diode D4 and the sixth resistor R12 may be connected in series between the second node N4 and the bulk terminal BT2.

The first resistor R7, the second resistor R8, the third resistor R9, the fourth resistor R10, the fifth resistor R11, the sixth resistor R12, the first diode D3, and the second diode D4 may be similar to the first resistor R1, the second resistor R2, the third resistor R3, the fourth resistor R4, the fifth resistor R5, the sixth resistor R6, the first diode D1, and the second diode D2 in FIG. 1, respectively.

The gate electrode GE2 of the first field effect transistor MP2 may be connected to a gate terminal GT2 for external connection.

Figure 7:
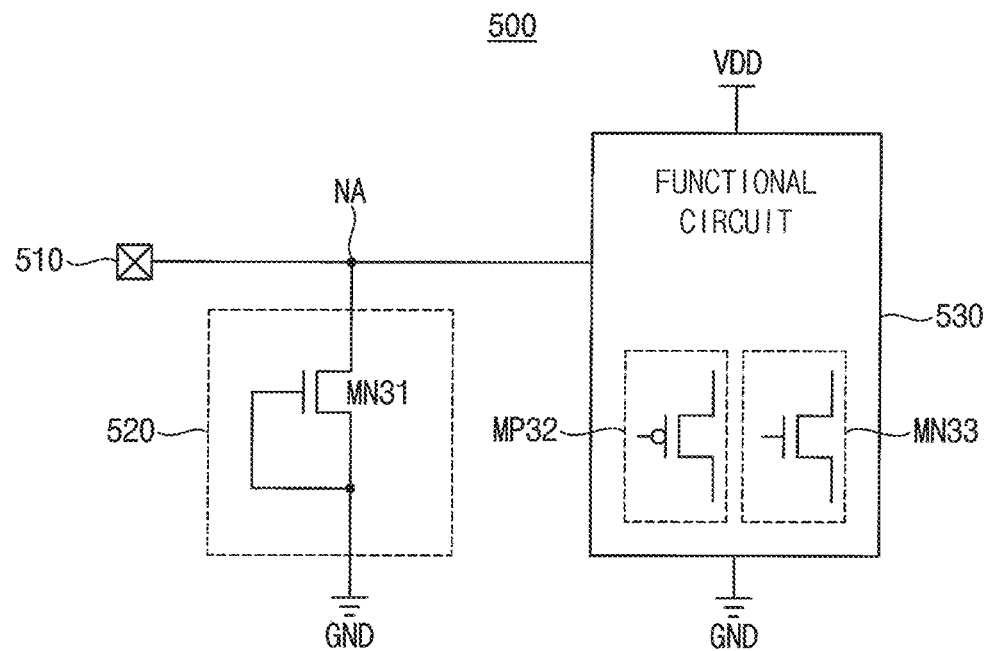
FIGS. 7 and 8 are block diagrams illustrating examples of an integrated circuit that is designed using a modeling circuit according to some example embodiments.
Figure 8:
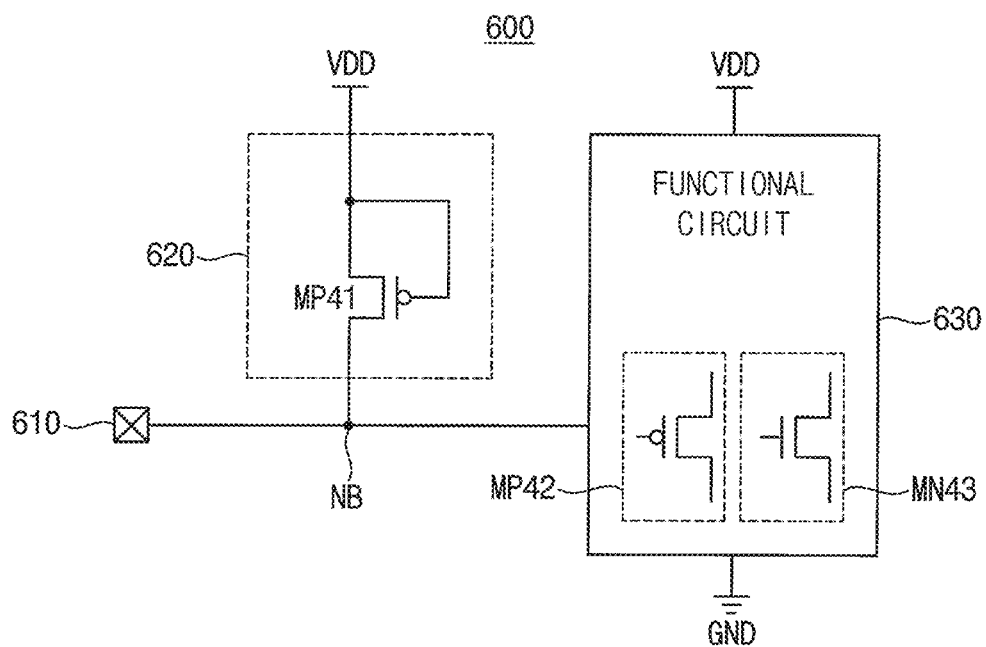

FIGS. 7 and 8 are block diagrams illustrating examples of an integrated circuit that is designed using a modeling circuit according to some example embodiments.

Referring to FIG. 7, an integrated circuit 500 includes an input/output (I/O) pad 510, an electrostatic discharge (ESD) protection circuit 520 and a functional circuit (or an internal circuit) 530.

The I/O pad 510 may be a pad for inputting and/or outputting a signal. For example, a pad may be a contact pad or a contact pin, but example embodiments are not limited thereto.

The ESD protection circuit 520 may be a circuit for preventing or reducing the impact of static electricity such as static electricity from triboelectric discharge or other static electricity occurring during the fabrication of and/or operation of the integrated circuit 500 such as plasma processing used during the fabrication of the integrated circuit 500. As a design rule of an integrated circuit is ever-decreasing and a degree of integration of the integrated circuit is ever-increasing, a concern on ESD increases. The integrated circuit 500 may include the ESD protection circuit 520 used to prevent or reduce the impact from electric charge abnormally incoming from the I/O pad 510 of the integrated circuit 500.

The ESD protection circuit 520 may limit a magnitude of a voltage of a node NA, to which the I/O pad 510 and the functional circuit 530 are connected, within a specific (or, alternatively, predetermined) range by providing a current path when a positive over-voltage due to an ESD event is applied to the I/O pad 510. Therefore, the functional circuit 530 may be partially or fully protected. For example, the ESD protection circuit 520 may include an NMOS transistor MN31. For example, the NMOS transistor MN31 may be connected between the node NA and a ground voltage GND, a gate electrode of the NMOS transistor MN31 may be connected to the ground voltage GND, and thus the NMOS transistor MN31 may be referred to as a gate-grounded NMOS (GGNMOS) transistor or a gate-grounded NMOS-FET.

The functional circuit 530 may be or may include a circuit for performing an operation of the integrated circuit 500. For example, the functional circuit 530 may include a plurality of functional blocks that are divided or individualized by their own functions. For example, the plurality of functional blocks may include at least one of a display control block, a file system block, a graphic processing unit (GPU) block, an image signal processing block, a multi-format codec block, or the like. For example, the functional circuit 530 may be connected between (e.g. directly connected between) a power supply voltage VDD and the ground voltage GND, and may include a PMOS transistor MP32 and an NMOS transistor MN33.

Although FIG. 7 illustrates that the integrated circuit 500 includes one I/O pad 510, one ESD protection circuit 520 and one functional circuit 530, example embodiments are not limited thereto, and the integrated circuit may include a plurality of I/O pads, a plurality of ESD protection circuits and a plurality of functional circuits.

Referring to FIG. 8, an integrated circuit 600 includes an I/O pad 610, an ESD protection circuit 620 and a functional circuit 630. The descriptions repeated with FIG. 7 will be omitted for brevity.

The I/O pad 610 may be a pad for inputting and/or outputting a signal. The I/O pad 610 may be substantially the same as the I/O pad 510 in FIG. 7.

The ESD protection circuit 620 may be a circuit for preventing or reducing the impact of or effect of static electricity such as static electricity from triboelectric discharge or other static electricity occurring during the fabrication of and/or operation of the integrated circuit 600 such as plasma processing used during the fabrication of the integrated circuit 600. The ESD protection circuit 620 may limit a magnitude of a voltage of a node NB, to which the I/O pad 610 and the functional circuit 630 are connected, within a predetermined range by providing a current path when a negative over-voltage due to an ESD event is applied to the I/O pad 610. Therefore, the functional circuit 630 may be protected or at least partially protected from static electricity such as from triboelectric discharge. For example, the ESD protection circuit 620 may include a PMOS transistor MP41. For example, the PMOS transistor MP41 may be connected between the power supply voltage VDD and the node NB, and a gate electrode of the PMOS transistor MP41 may be connected to the power supply voltage VDD, and thus the PMOS transistor MP41 may be referred to as a gate-grounded PMOS (GGPMOS) transistor or a gate-grounded PMOSFET.

The functional circuit 630 may be or may include a circuit for performing an operation of the integrated circuit 600. For example, the functional circuit 630 may include a PMOS transistor MP42 and an NMOS transistor MN43. The functional circuit 630 may be substantially the same as the functional circuit 530 in FIG. 7; however, example embodiments are not limited thereto.

Figure 9:
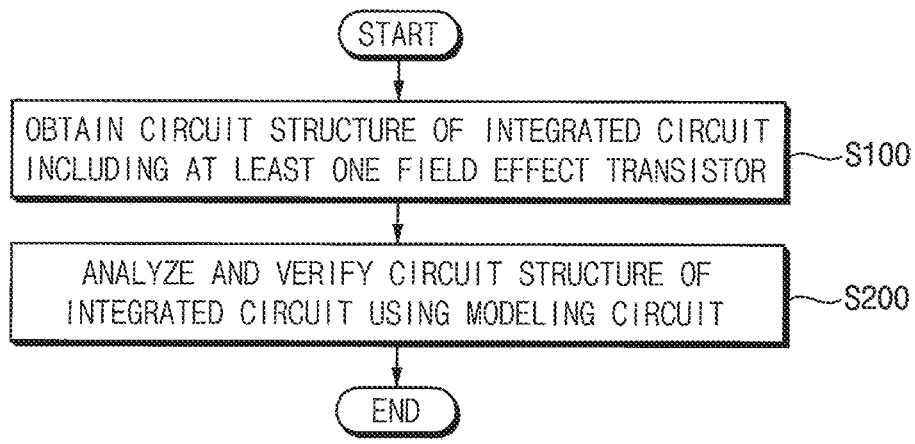
FIG. 9 is a flowchart illustrating a method of designing an integrated circuit according to some example embodiments.

FIG. 9 is a flowchart illustrating a method of designing an integrated circuit according to some example embodiments.

Referring to FIG. 9 in a method of designing an integrated circuit according to some example embodiments, a circuit structure of the integrated circuit including at least one field effect transistor is obtained (step S100). For example, the circuit structure of the integrated circuit may represent a design layout, may include a plurality of circuit patterns, layout patterns and/or corresponding polygons, and may be provided by at least one of various design tools.

The circuit structure of the integrated circuit is analyzed and verified using a modeling circuit of a field effect transistor (step S200). The modeling circuit of the field effect transistor may be the modeling circuit according to some example embodiments described with reference to FIGS. 1 through 6. For example, step S200 may be performed or at least partially performed by the SPICE. Step S200 will be described with reference to FIG. 10.

In the method of designing the integrated circuit according to some example embodiments, the analysis and verification operations may be performed using at least one of the modeling circuits 100 and 200 according to some example embodiments. The modeling circuits 100 and 200 may perform the symmetrical modeling, and thus more accurate analysis may be performed regardless of the connection status of the element. In addition, the accuracy of modeling and/or simulation may be improved, and the problem associated with convergence may be prevented even when the large-scaled I/O circuits are analyzed using the SPICE. Accordingly, the modeling circuits 100 and 200 may be applicable to most field effect transistors in the integrated circuit, and the accuracy and/or efficiency of the analysis and verification operations may be improved. The modeling circuits 100 and 200 may be used during the manufacturing of the integrated circuit. For example, the integrated circuit may be fabricated based on the modeling circuits 100 and 200.

Figure 10:
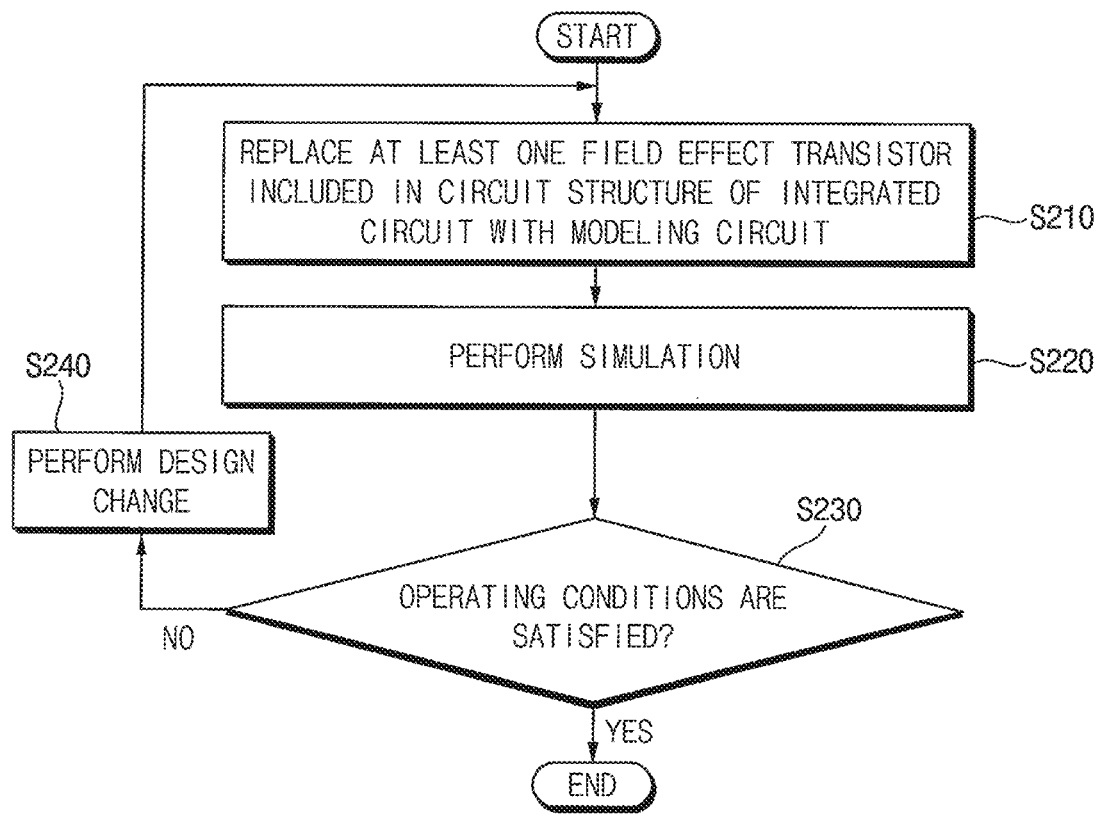
FIG. 10 is a flowchart illustrating an example of analyzing and verifying a circuit structure of an integrated circuit in FIG. 9.

FIG. 10 is a flowchart illustrating an example of analyzing and verifying a circuit structure of an integrated circuit in FIG. 9.

Referring to FIGS. 9 and 10, when analyzing and verifying the circuit structure of the integrated circuit using the modeling circuit (step S200), the at least one field effect transistor included in the circuit structure of the integrated circuit may be replaced with the modeling circuit (step S210).

For example, as described with reference to FIGS. 7 and 8, the at least one field effect transistor included in the circuit structure of the integrated circuit may be included in at least one of an ESD protection circuit or a functional circuit included in the integrated circuit. All field effect transistors included in the circuit structure of the integrated circuit may be replaced with the modeling circuits 100 and 200. For example, when the integrated circuit 500 of FIG. 7 is to be analyzed and verified, each of the NMOS transistors MN31 and MN33 may be replaced with the modeling circuit 100 of FIG. 1, and the PMOS transistor MP32 may be replaced with the modeling circuit 200 of FIG. 6. For example, the NMOS transistors MN31 may be replaced with the modeling circuit 100 such that the first terminal DT1, the second terminal ST1, the gate terminal GT1 and the bulk terminal BT1 of the modeling circuit 100 correspond to a drain electrode, a source electrode, a gate electrode and a bulk electrode of the NMOS transistor MN31, respectively.

Based on a plurality of operating conditions, the circuit structure of the integrated circuit including the modeling circuit may be simulated, e.g., a simulation may be performed on the circuit structure of the integrated circuit in which the at least one field effect transistor is replaced with the modeling circuit (step S220).

When at least one of the plurality of operating conditions is not satisfied (step S230: NO), a design change may be performed on the circuit structure of the integrated circuit (step S240), and steps S210, S220 and S230 may be performed based on the changed design.

In some example embodiments, a design condition for the circuit structure of the integrated circuit may be changed. For example, the circuit structure of the integrated circuit may be re-designed to change a circuit configuration, a layout, or the like. In some example embodiments, a process or a process condition used for manufacturing the circuit structure of the integrated circuit may be changed. For example, process equipments, process orders, various parameters in process, and/or the like, may be tuned. In some example embodiments, a product specification for the circuit structure of the integrated circuit may be changed. According to some example embodiments, at least two of the design condition, the process condition and the product specification may be simultaneously or concurrently changed.

When all of the plurality of operating conditions are satisfied (step S230: YES), the analysis and verification operations may be determined to be successfully completed, and thus the design process may be terminated.

Figure 11:
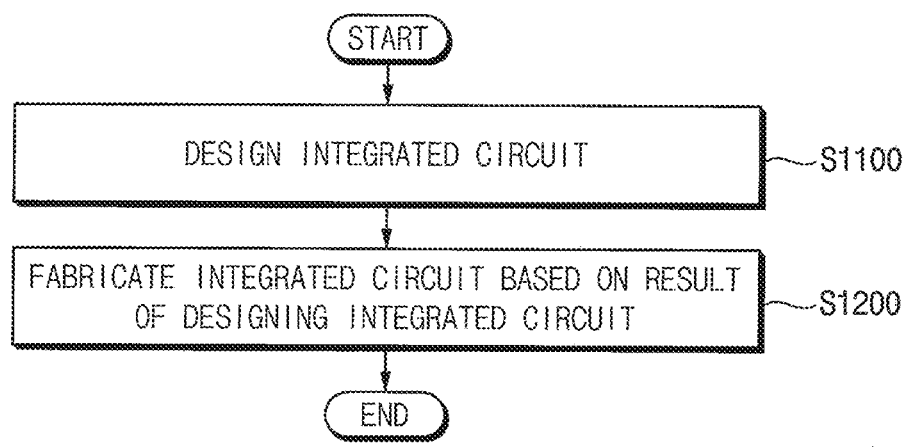
FIG. 11 is a flowchart illustrating a method of manufacturing an integrated circuit according to some example embodiments.

FIG. 11 is a flowchart illustrating a method of manufacturing an integrated circuit according to some example embodiments.

Referring to FIG. 11, in a method of manufacturing/fabricating an integrated circuit according to some example embodiments, the integrated circuit including at least one field effect transistor is designed (step S1100), and the integrated circuit is fabricated based on a result of designing the integrated circuit (step S1200). The designing operation in step S1100 may be performed based on the method of designing the integrated circuit according to some example embodiments described with reference to FIG. 9.

As will be appreciated by those of ordinary skill in the art, inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, and/or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Inventive concepts may be applied to various electronic devices and/or systems that include glitch detectors and/or security devices. For example, inventive concepts may be applied to systems such as at least one of a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The modeling circuits 100 and 200 may be or correspond to physical devices; alternatively or additionally the modeling circuits 100 and 200 may be or correspond to data files, such as data files used in a SPICE modeling operation and stored in a non-transient computer-readable medium.

The modeling circuits 100 and 200 may be used in the modeling and fabrication of an integrated circuit, and/or in the design and fabrication of an integrated circuit, and/or in the verification and fabrication of an integrated circuit.

The foregoing is illustrative of some example embodiments and is not to be construed as limiting thereof. Although some example embodiments have been described, those of ordinary skill in the art will readily appreciate that many modifications are possible in the example embodiments without materially departing from the novel teachings and advantages of example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to example embodiments, as well as other example embodiments, are intended to be included within the scope of the appended claims. Additionally, example embodiments are not necessarily mutually exclusive to one another.

What is claimed is:

1. A modeling circuit comprising:
   a first field effect transistor on a semiconductor substrate, the first field effect transistor including a first electrode and a second electrode;
   a first bipolar transistor having a first collector electrode connected to a first node corresponding to the first electrode of the first field effect transistor, a first emitter electrode connected to a second node corresponding to the second electrode of the first field effect transistor, and a first base electrode;
   a second bipolar transistor having a second collector electrode connected to the second node, a second emitter electrode connected to the first node, and a second base electrode connected to the first base electrode of the first bipolar transistor; and
   a substrate resistor connected between the first and second base electrodes and a first surface of the semiconductor substrate.

2. The modeling circuit of claim 1, further comprising:
   a first resistor connected between the first electrode of the first field effect transistor and the first node;
   a second resistor connected between the second electrode of the first field effect transistor and the second node;
   a third resistor connected between the first node and a first external connection terminal; and
   a fourth resistor connected between the second node and a second external connection terminal.

3. The modeling circuit of claim 2, wherein:
   the first and second resistors correspond to active resistances of the first field effect transistor, and
   the third and fourth resistors correspond to parasitic active resistances of the first and second bipolar transistors.

4. The modeling circuit of claim 2, further comprising:
   a first diode and a fifth resistor connected in series between the first node and the first surface of the semiconductor substrate; and
   a second diode and a sixth resistor connected in series between the second node and the first surface of the semiconductor substrate.

5. The modeling circuit of claim 1, wherein the first field effect transistor is configured to be symmetrically modeled based on a forward active characteristic of the first bipolar transistor and a reverse active characteristic of the second bipolar transistor, or
   is configured to be symmetrically modeled based on a reverse active characteristic of the first bipolar transistor and a forward active characteristic of the second bipolar transistor.

6. The modeling circuit of claim 5, wherein each of the first and second bipolar transistors includes a most exquisite transistor model-bipolar junction transistor (MEXTRAM-BJT).

7. The modeling circuit of claim 1, wherein:
   a first terminal corresponds to the first electrode of the first field effect transistor, a second terminal corresponds to the second electrode of the first field effect transistor, a gate terminal corresponds to a gate electrode of the first field effect transistor, and a bulk terminal corresponds to the semiconductor substrate, and
   the modeling circuit is configured to have operating characteristics during a first operation mode in which the gate terminal, the second terminal, and the bulk terminal are connected in common be the same as operating characteristics during a second operation mode in which the gate terminal, the first terminal, and the bulk terminal are connected in common.

8. The modeling circuit of claim 7, wherein a first operating characteristic by a first driving scheme in which a first driving current is applied through the first terminal during the first operation mode is the same as a second operating characteristic by a second driving scheme in which a second driving current is applied through the second terminal during second operation mode.

9. The modeling circuit of claim 8, wherein the first driving scheme and the second driving scheme correspond to a snapback mode.

10. The modeling circuit of claim 8, wherein a third operating characteristic by a third driving scheme in which a third driving current is applied through the second terminal during the first operation mode is the same as a fourth operating characteristic by a fourth driving scheme in which a fourth driving current is applied through the first terminal during the second operation mode.

11. The modeling circuit of claim 10, wherein the third driving scheme and the fourth driving scheme correspond to a diode mode.

12. The modeling circuit of claim 7, wherein:
in response to the first bipolar transistor being turned on, the second bipolar transistor is turned off, and
in response to the second bipolar transistor being turned on, the first bipolar transistor is turned off.

13. The modeling circuit of claim 1, wherein:
the first field effect transistor includes an n-type metal oxide semiconductor field effect transistor (NMOSFET), and
each of the first and second bipolar transistors includes an NPN-type bipolar junction transistor (BJT).

14. The modeling circuit of claim 13, wherein the first field effect transistor includes a gate-grounded NMOSFET.

15. The modeling circuit of claim 1, wherein:
the first field effect transistor includes a p-type metal oxide semiconductor field effect transistor (PMOSFET), and
each of the first and second bipolar transistors includes a PNP-type BJT.

16. The modeling circuit of claim 15, wherein the first field effect transistor includes a gate-grounded PMOSFET.

17. A method of designing an integrated circuit, the method comprising:
obtaining a circuit structure of the integrated circuit, the circuit structure including at least one field effect transistor; and
analyzing the circuit structure and verifying the circuit structure, the analyzing and verifying using a modeling circuit of a field effect transistor,
wherein the modeling circuit includes,
a first field effect transistor on a semiconductor substrate,
a first bipolar transistor having a first collector electrode connected to a first node corresponding to a first electrode of the first field effect transistor, a first emitter electrode connected to a second node corresponding to a second electrode of the first field effect transistor, and a first base electrode,
a second bipolar transistor having a second collector electrode connected to the second node, a second emitter electrode connected to the first node, and a second base electrode connected to the first base electrode of the first bipolar transistor, and
a substrate resistor connected between the first and second base electrodes and a first surface of the semiconductor substrate.

18. The method of claim 17, wherein the analyzing and the verifying the circuit structure of the integrated circuit includes:

replacing the at least one field effect transistor included in the circuit structure of the integrated circuit with the modeling circuit; and
simulating whether the circuit structure of the integrated circuit including the modeling circuit satisfies a plurality of operating conditions.

19. The method of claim 17, wherein the integrated circuit includes:
at least one electrostatic discharge (ESD) protection circuit configured to reduce an impact of static electricity; and
at least one functional circuit configured to perform an operation of the integrated circuit,
wherein at least one of the at least one ESD protection circuit includes the at least one field effect transistor, or the at least one functional circuit includes the at least one field effect transistor.

20. A modeling circuit of a field effect transistor comprising:
a first n-type metal oxide semiconductor field effect transistor (NMOSFET) having a drain electrode, a source electrode, a gate electrode, and a bulk electrode;
a first resistor connected between the drain electrode of the first NMOSFET and a first node;
a second resistor connected between the source electrode of the first NMOSFET and a second node;
a third resistor connected between the first node and a drain terminal for external connection;
a fourth resistor connected between the second node and a source terminal for external connection;
a first most exquisite transistor model-bipolar junction transistor (MEXTRAM-BJT) having a first collector electrode connected to the first node, a first emitter electrode connected to the second node, and a first base electrode;
a second MEXTRAM-BJT having a second collector electrode connected to the second node, a second emitter electrode connected to the first node, and a second base electrode connected to the bulk electrode of the first NMOSFET and the first base electrode of the first MEXTRAM-BJT;
a substrate resistor connected between the first and second base electrodes and a bulk external connection terminal;
a first diode and a fifth resistor connected in series between the first node and the bulk external connection terminal; and
a second diode and a sixth resistor connected in series between the second node and the bulk external connection terminal,
wherein the first and second resistors correspond to MOSFET active resistances of the first NMOSFET, and
the third and fourth resistors correspond to parasitic BJT active resistances of the first and second MEXTRAM-BJTs.

* * * * *